United States Patent
Wang

(10) Patent No.: US 10,178,644 B2
(45) Date of Patent: Jan. 8, 2019

(54) POSITIONING METHODS FOR A COMMUNICATION DEVICE AND A POSITIONING SERVER IN A WIRELESS COMMUNICATION ENVIRONMENT

(71) Applicant: Telefonaktiebolaget LM Ericsson (publ), Stockholm (SE)

(72) Inventor: Xiaohui Wang, Limhamn (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 57 days.

(21) Appl. No.: 15/307,811

(22) PCT Filed: Feb. 20, 2015

(86) PCT No.: PCT/EP2015/053636
§ 371 (c)(1),
(2) Date: Oct. 29, 2016

(87) PCT Pub. No.: WO2016/131494
PCT Pub. Date: Aug. 25, 2016

(65) Prior Publication Data
US 2018/0184394 A1      Jun. 28, 2018

(51) Int. Cl.
*H04W 64/00* (2009.01)
*H04W 24/02* (2009.01)
(Continued)

(52) U.S. Cl.
CPC ........ *H04W 64/003* (2013.01); *H04B 17/318* (2015.01); *H04W 16/18* (2013.01); *H04W 24/02* (2013.01)

(58) Field of Classification Search
CPC . G01S 5/14; G01S 5/0263; G01S 5/04; G01S 13/46; G01S 2013/468;
(Continued)

(56) References Cited

U.S. PATENT DOCUMENTS

| 8,700,060 B2 | 4/2014 | Huang |
| 2013/0029685 A1 | 1/2013 | Moshfeghi |

(Continued)

OTHER PUBLICATIONS

Christian Esposito et al., Calibrating RSS-based Indoor Positioning Systems, Wireless and Mobile Computing, Networking and Communications, IEEE International Conference, Oct. 12, 2009, Piscataway, NJ, USA, pp. 1-6.

(Continued)

*Primary Examiner* — Kwasi Karikari
(74) *Attorney, Agent, or Firm* — Leffler Intellectual Property Law, PLLC

(57) ABSTRACT

A communication device and method therein for obtaining a position of the communication device are disclosed. The communication device operates in a wireless communication environment which comprises wireless communication networks comprising one or more wider range Access Points and Localized Wireless Networks (LWN) comprising one or more LWN Access Points. The communication device determines if it is in an LWN, when it in an LWN, it receives its position from an LWN AP in the LWN. Then it measures and records a first set of Received Signal Strength values of one or more wider range Access Points. When it is not in an LWN, it measures and records a second set of RSS values of the one or more wider range APs, and scales each of the second set of RSS values by a scaling factor calculated for each of the one or more wider range APs based on the first set of RSS values and reference RSS values of the one or more wider range APs. And then the communication device calculates the position based on the scaled RSS values.

22 Claims, 6 Drawing Sheets

(51) Int. Cl.
*H04W 16/18* (2009.01)
*H04B 17/318* (2015.01)

(58) Field of Classification Search
CPC ...... G01S 3/023; G01S 5/0236; H04W 84/12; H04W 64/006; H04W 4/025; H04W 64/003; H04W 84/005; H04W 4/04; H04W 52/245; H04W 52/246
See application file for complete search history.

(56) References Cited

U.S. PATENT DOCUMENTS

| | | |
|---|---|---|
| 2013/0157685 A1 | 6/2013 | Young |
| 2014/0045526 A1 | 2/2014 | Moshfeghi |
| 2014/0266585 A1 | 9/2014 | Chao et al. |
| 2014/0295880 A1* | 10/2014 | Ranki ................. G01S 3/18 455/456.1 |

OTHER PUBLICATIONS

Ana M Bernardos et al., Real time calibration for RSS indoor positioning systems, Indoor Positioning and Indoor Navigation (IPIN), 2010 International Conference, IEEE Sep. 15, 2010, Piscataway, NJ, USA, pp. 1-7.
PCT International Search Report, dated Nov. 20, 2015, in connection with International Application No. PCT/EP2015/053636, all pages.
PCT Written Opinion, dated Nov. 20, 2015, in connection with International Application No. PCT/EP2015/053636, all pages.
A.K.M. Mahtab Hossain et al., WiFi_FingerPrint-Pos_SSD_RSSI: "SSD: A Robust RF Location Fingerprint Addressing Mobile Devices' Heterogeneity", date unknown, pp. 1-13.

\* cited by examiner

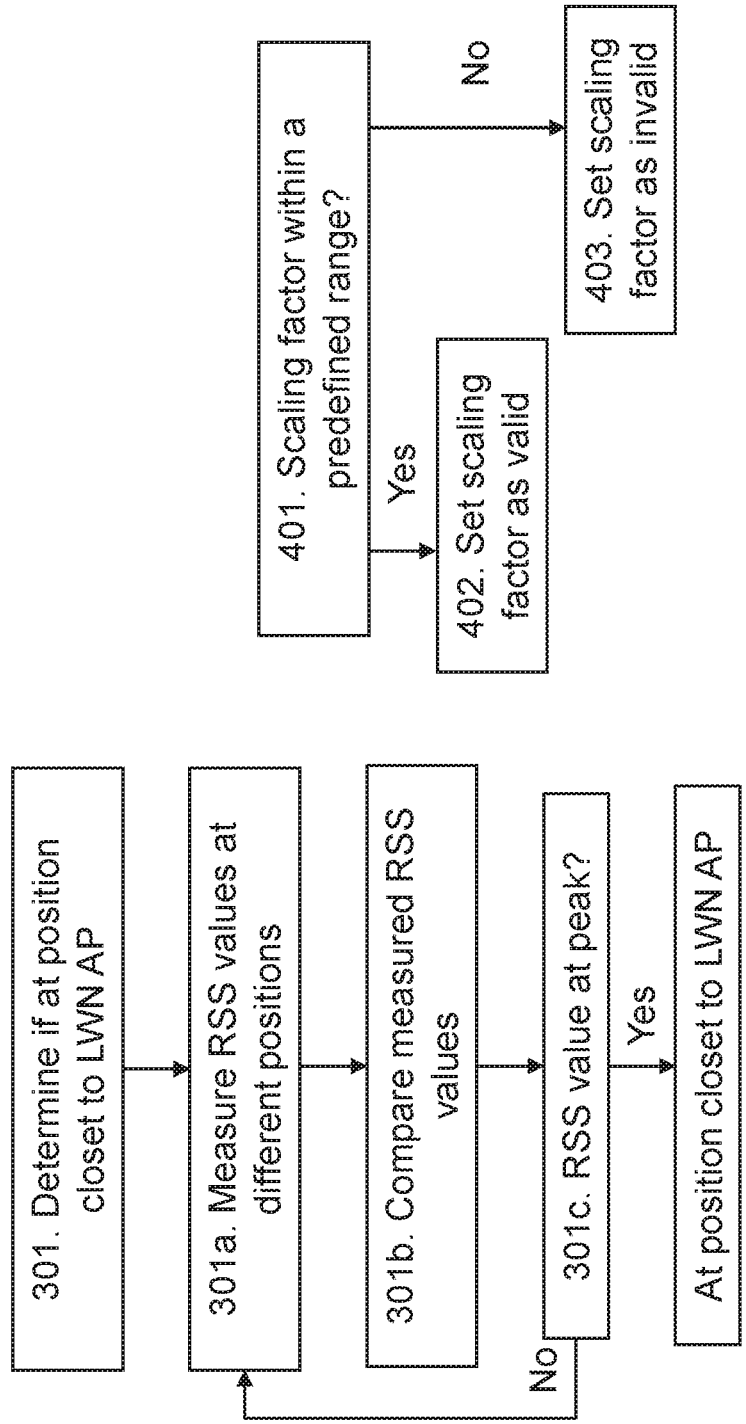

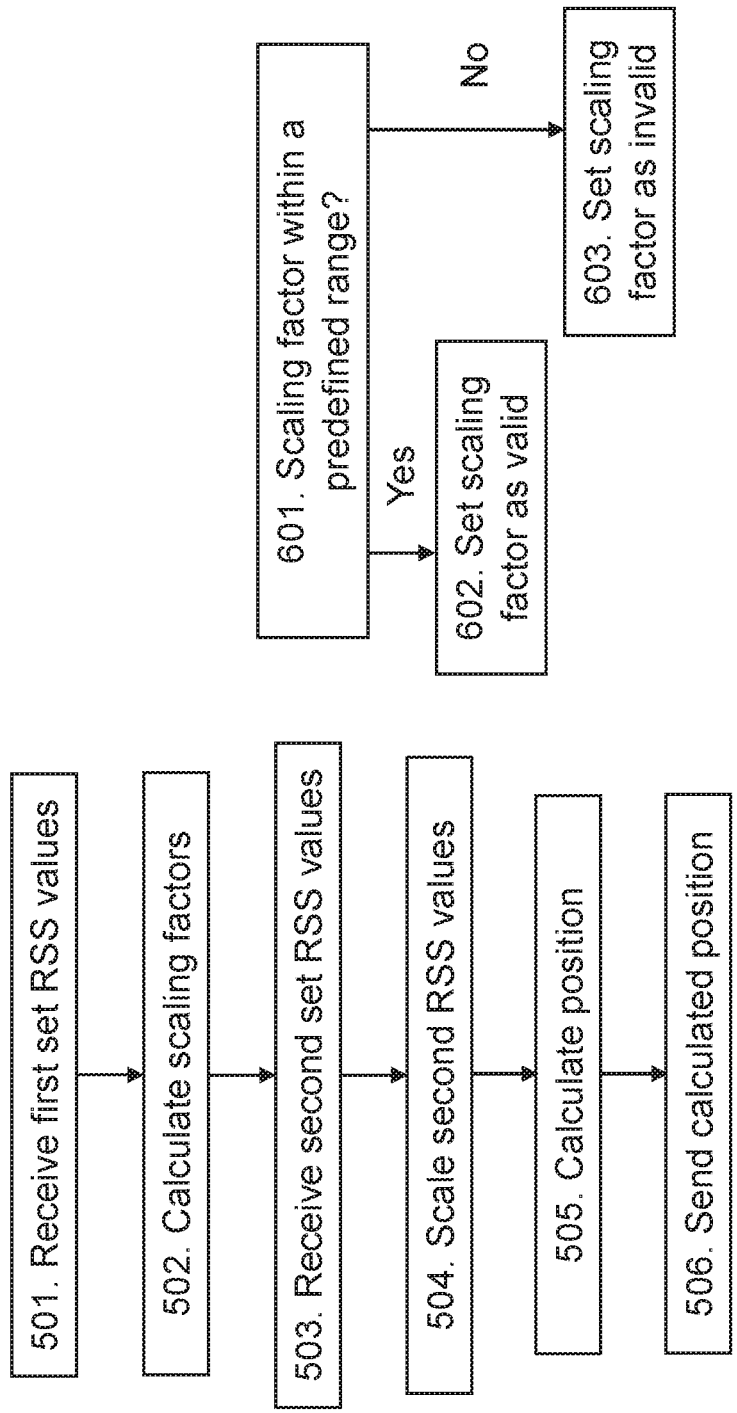

POSITIONING METHODS FOR A COMMUNICATION DEVICE AND A POSITIONING SERVER IN A WIRELESS COMMUNICATION ENVIRONMENT

TECHNICAL FIELD

Embodiments herein relate to a communication device, a positioning server and methods therein. In particular, they relate to methods for determining the position of the communication device in a wireless communication environment comprising multiple wireless communication networks.

BACKGROUND

Communication devices such as User Equipments (UE) are also known as e.g. wireless terminals, mobile terminals, mobile stations or mobile devices. Communication devices are enabled to communicate or operate wirelessly in a heterogeneous wireless communication environment comprising multiple wireless communication networks. The heterogeneous wireless communication environment may comprise cellular communications networks complying with the 3rd Generation Partnership Project (3GPP) standard, e.g. Second/Third Generation (2G/3G) network, 3G/4G Long Term Evolution (LTE) network, Worldwide interoperability for Microwave Access (WiMAX) network etc., satellite positioning systems, e.g. Global navigation satellite systems (GNSS) and Global Positioning System (GPS) etc., wireless local networks, such as Wireless Local Area Networks (WLAN) or Wi-Fi/Wi-Fi Direct networks etc. as well as other short-range wireless communication networks using various technology standards, e.g. Near Field Communication (NFC), Bluetooth or Bluetooth Low Energy (BLE), Radio Frequency Identification (RFID) and 60 GHz and Ultra-wideband (UWB) standards etc.

Communication devices may further be referred to as mobile telephones, cellular telephones, smart phones, laptops, tablet computers or phablets with wireless communication capability, just to mention some further examples. The communication device in the present context may be, for example, portable, pocket-storable, hand-held, computer-comprised, or vehicle-mounted mobile devices, enabled to communicate voice and/or data via an access point with another entity, such as another communication device or a server in the wireless communication environment.

Mobile Positioning for estimating the position of a communication device uses a number of different techniques that use wireless signals and process them into a location or position estimation. Typical information used for positioning includes GPS signals, Received Signal Strength Indicator (RSSI), single trip or round-trip Time Of Arrival (TOA), Time Difference Of Arrival (TDOA), Angle Of Arrival (AOA), and Doppler shift etc. These techniques are complementary since some methods are more suited for indoor settings while others are more reliable in outdoor settings.

There are however a number of sources of errors in wireless positioning methods. One of the sources of errors is multipath propagation, which occurs when a signal takes different paths when propagating from a source to a destination receiver. While the signal is traveling, objects get in the way and cause the signal to bounce in different directions before getting to the receiver. As a result, some of the signals are delayed and travel longer paths to the receiver. In other instances there is no direct line of sight because an object is completely blocking and any received signals occur only due to multipath propagation. A Radio Frequency (RF) signal amplitude is also greatly affected by metal objects, reflective surfaces, multipath, dead-spots, noise and interference. These effects cause errors in GPS data, RSSI, AOA, TOA, TDOA and Doppler shift. For example, the longer multipath propagations also result in smaller signal amplitude indicators such as RSSI, as well as incorrect values for AOA and Doppler shifts. Other sources of positioning errors are clock drift, synchronization errors, and measurement errors. These errors cause incorrect mobile position calculations for traditional location techniques.

Indoor Mobile Positioning has gained increasing tractions in recent years due to the widely deployed smart phones and indoor mobile networks such as small cells, Wi-Fi, BLE or RFID which provide improved infrastructures for assisting and signal processing of Mobile Positioning. As discussed above, GPS and GNSS are generally not suitable to establish indoor locations, since microwaves will be attenuated and scattered by roofs, walls and other objects which causes the GPS and GNSS signals are too weak to use. Furthermore cell-based wireless networks, e.g. cellular communications networks are optimal for communications but not positioning.

U.S. Pat. No. 8,700,060 has provided a solution based on location databases which associates the location of an Access Point (AP) to its Identity (ID), and a UE may calculate its position from the locations of the APs stored in the location database and reachable by the UE. One of the problems of this solution is to build up databases using the locations of the UEs gained from GPS, which is in general not feasible for indoor environment for the reason described above. Further there is a large amount of data to be created, transferred via the network, processed and stored in the location database server as well as in the local location database in the UE, and keep them updated. Moreover considerable number of APs should be in the reach of the UE simultaneously and the locations of the APs are usually not the physical locations of the APs or the UE, but the statistical average locations of other UEs reported to the location database. As a result, the accuracy of the calculated position of the UE is unpredictable.

US2013029685 has developed a solution which employees localized wireless reference devices for re-calibrating a position of a mobile terminal. The solution uses position assistance information from the reference devices to replace the computed position at a reference point, and then to modify parameters such as clocks of the APs or weights of positions computed from measured RSS values to make the computed position match to the known one at the reference point. However the measured RSS values are dynamic and depend heavily on the surrounding radio environment, and thus the positions computed directly from the measured RSS values are unstable and unreliable. Consequently the efforts to perform a posteriori processes based on such inputs would hardly lead to convergent and accurate results.

SUMMARY

Therefore it is an object of embodiments herein to provide an improved positioning method for communication devices in a wireless communication environment.

According to a first aspect of embodiments herein, the object is achieved by a method in a communication device for obtaining a position of the communication device. The communication device operates in a wireless communication environment and the wireless communication environment comprises multiple wireless communication networks comprising one or more Access Points (APs) and Localized Wireless Networks (LWN) comprising one or more LWN APs. The APs in the multiple wireless communication networks have a wider range compared to the LWN APs. The communication device first determines if it is in an LWN. When the communication device is in an LWN, it obtains its position from an LWN AP in the LWN and measures and records a first set of Received Signal Strength (RSS) values of one or more wider range APs. When the communication device is not in an LWN, it measures and records a second set of RSS values of the one or more wider range APs. The communication device then scales each of the second set of RSS values by a scaling factor calculated for each of the one or more wider range APs based on the first set of RSS values and reference RSS values of the one or more wider range APs, and calculates its position based on the scaled RSS values.

According to a second aspect of embodiments herein, the object is achieved by a communication device for obtaining a position of the communication device. The communication device operates in a wireless communication environment and the wireless communication environment comprises multiple wireless communication networks comprising one or more Access Points (APs) and Localized Wireless Networks (LWN) comprising one or more LWN APs. The APs in the multiple wireless communication networks have a wider range compared to the LWN APs. The communication device is configured to determine if it is in an LWN. The communication device is configured to obtain its position from an LWN AP in the LWN when the communication device is in an LWN, and measure and record a first set of Received Signal Strength (RSS) values of one or more wider range APs. The communication device is configured to measure and record a second set of RSS values of the one or more wider range APs when the communication device is not in an LWN. The communication device is further configured to scale each of the second set of RSS values by a scaling factor calculated for each of the one or more wider range APs based on the first set of RSS values and reference RSS values of the one or more wider range APs. The communication device then calculates its position based on the scaled RSS values.

According to a third aspect of embodiments herein, the object is achieved by a method in a positioning server for determining a position of the communication device. The positioning server receives a first set of RSS values measured for one or more wider range APs by the communication device when the communication device is in an LWN. The positioning server calculates a scaling factor for each of the one or more wider range APs based on the first set of RSS values and reference RSS values of the one or more wider range APs. The positioning server receives a second set of RSS values measured for one or more wider range APs by the communication device when the communication device is not in an LWN. Then the positioning server scales each of the second set of RSS values by the scaling factor calculated for each of the one or more wider range APs and calculates the position of the communication device based on the scaled RSS values. The positioning server sends the calculated position to the communication device.

According to a fourth aspect of embodiments herein, the object is achieved by a positioning server for determining a position of the communication device. The positioning server is configured to receive a first set of RSS values measured for one or more wider range APs by the communication device when the communication device is in an LWN. The positioning server is further configured to calculate a scaling factor for each of the one or more wider range APs based on the first set of RSS values and reference RSS values of the one or more wider range APs. The positioning server is further configured to receive a second set of RSS values measured for one or more wider range APs by the communication device when the communication device is not in an LWN. Then the positioning server is configured to scale each of the second set of RSS values by the scaling factor calculated for each of the one or more wider range APs and calculate the position of the communication device based on the scaled RSS values. Finally the positioning server is configured to send the calculated position to the communication device.

According to embodiments herein, when the communication device is in an LWN, it obtains its position from an LWN AP in the LWN. The LWN APs are usually well-positioned and localized, and have shorter coverage, thus the position obtained based on the position information of the LWN APs will have high accuracy and at same time it is an efficient way to get its position for the communication device. Further the communication device measures and records a first set of RSS values of one or more wider range APs when it is in the LWN for calculations of scaling factors. When the communication device is not in an LWN, its position needs to be calculated based on measured RSS values. The communication device thus measures and records a second set of RSS values of the one or more wider range APs. Since the measured RSS value of a given AP may be influenced by the environment, e.g. wireless traffic variation with time, objects getting in the way, involved communication devices or people, errors in the measured second set of RSS values may occur. To compensate or correct the errors, the second set of RSS values of one or more wider range APs are scaled by a scaling factor before being used to calculate the position of the communication device. The scaling factor is calculated for each of the one or more wider range APs based on the first set of RSS values and reference RSS values of the one or more wider range APs. The reference RSS values are usually measured by a reference device at each of the one or more LWN APs in the LWN. The scaling factor calculated based on the first set of RSS values and the reference RSS values will have compensation effect to the errors in the measured second set of RSS values. This makes sure that the second set of RSS values scaled by the scaling factor are stable, accurate and reliable. Therefore the position calculated based on these scaled RSS vales, either by the communication device or by the positioning server, is also accurate and reliable.

Thus, embodiments herein provide improved methods for obtaining the position of a communication device with more accuracy and efficiency in a wireless communication environment.

BRIEF DESCRIPTION OF THE DRAWINGS

Examples of embodiments herein are described in more detail with reference to attached drawings in which:

FIG. 3 is a flowchart depicting one embodiment of a method in a communication device.

FIG. 4 is a flowchart depicting one embodiment of a method in a communication device.

FIG. 5 is a flowchart depicting one embodiment of a method in a positioning server.

FIG. 6 is a flowchart depicting one embodiment of a method in a positioning server.

DETAILED DESCRIPTION

Figure 1:
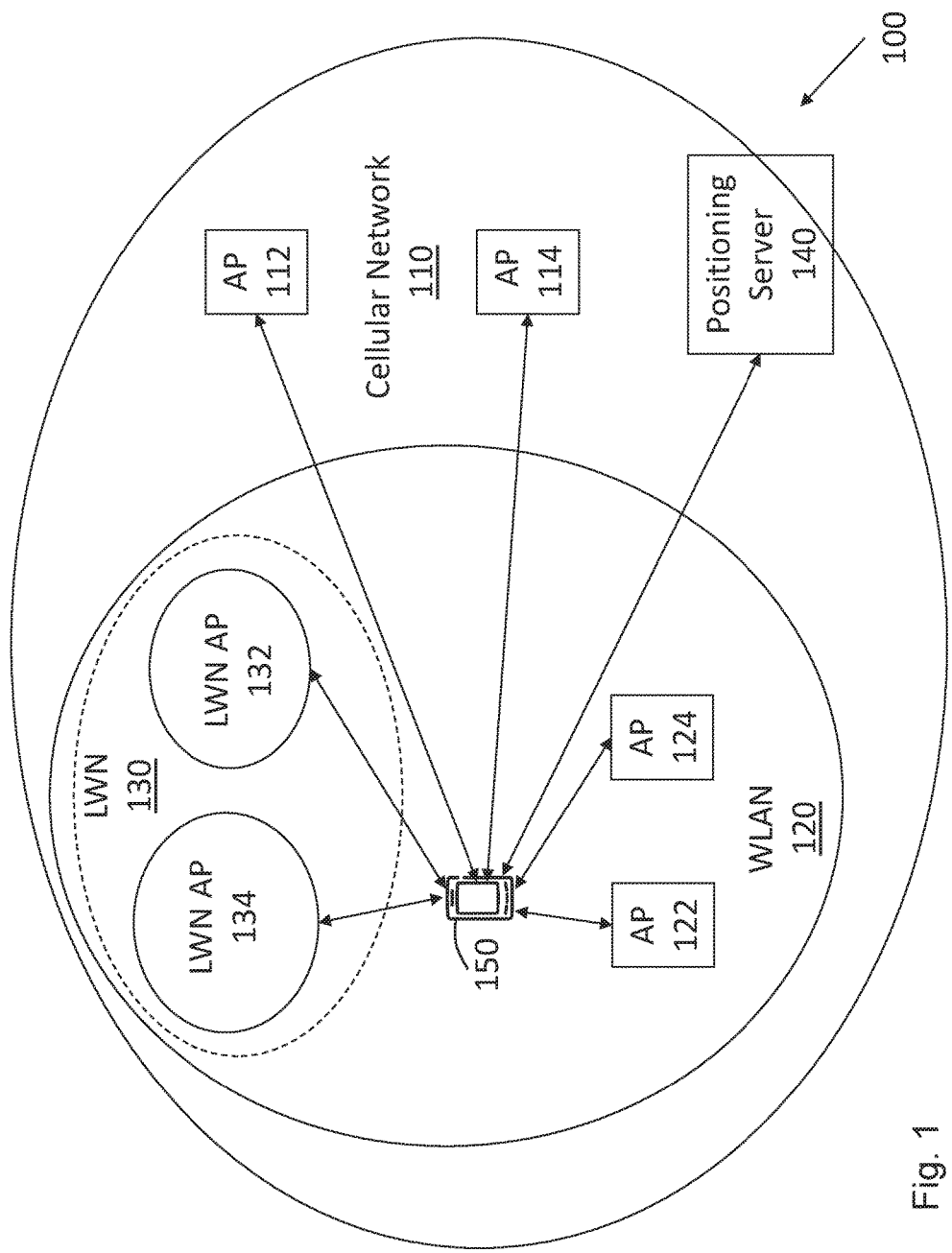
FIG. 1 is a schematic block diagram illustrating an example of a wireless communication environment.

FIG. 1 depicts an example of a wireless communication environment 100 in which embodiments herein may be implemented. The wireless communication environment 100 comprises multiple wireless networks, e.g. a cellular network 110, which may be any cellular communication network, e.g. an LTE network, a GSM network, a Wimax network etc. A cellular communications network usually covers a geographical area which is divided into cell areas, wherein each cell area being served by a base station, e.g. a Radio Base Station (RBS), which sometimes may be referred to as e.g. "eNB", "eNodeB", "NodeB", "B node", or Base Transceiver Station (BTS), depending on the technology and terminology used. Hereafter, base stations in the cellular communications network is in general referred as cellular network APs. The cellular network 110 comprises one or more APs, where AP 112, AP 114 are shown. The wireless communication environment 100 may further comprise one or more WLANs, where a WLAN 120 is shown which comprises one or more APs, such as AP 122, AP 124. The wireless communication environment 100 may further comprise one or more LWN, whereof an LWN 130 is shown in FIG. 1. The LWN 130 may comprise one or more well-positioned and localized APs, where AP 132, AP 134 are shown. The LWN 130 may be any wireless network comprising APs with short coverage, e.g. a Bluetooth network with BLE APs, RFID network or NFC network with active NFC-like APs etc. The LWN APs may be mounted at entrances of elevators or stairs in a building and have a coverage, e.g. 10 cm-20 m, depending on required positioning accuracy.

The AP112, AP114 in the cellular network 110 and the AP122, 124 in the WLAN 120 usually have a wider coverage compared to the AP 132, 134 in the LWN, and hereafter are referred as wider range APs.

A number of wireless communication devices operate in the wireless communication environment 100, whereof one, a communication device 150, is shown in FIG. 1. The communication device 150 may, e.g. be a mobile terminal or station, a wireless terminal, a mobile phone, a computer such as e.g. a laptop, a Personal Digital Assistants (PDAs) or a tablet computer, with wireless communication capability, or any other radio network units capable to communicate over a radio link in a wireless communications network. Please note the term communication device used in this document also covers other wireless devices such as Machine to machine (M2M) devices.

The wireless communication environment 100 further comprises a positioning Server 140. The positioning server 140 may be implemented anywhere in the wireless communication environment 100, either separately or associated with any wireless network, e.g. the cellular network 110, the WLAN 120 or the LWN 130.

Figure 2:
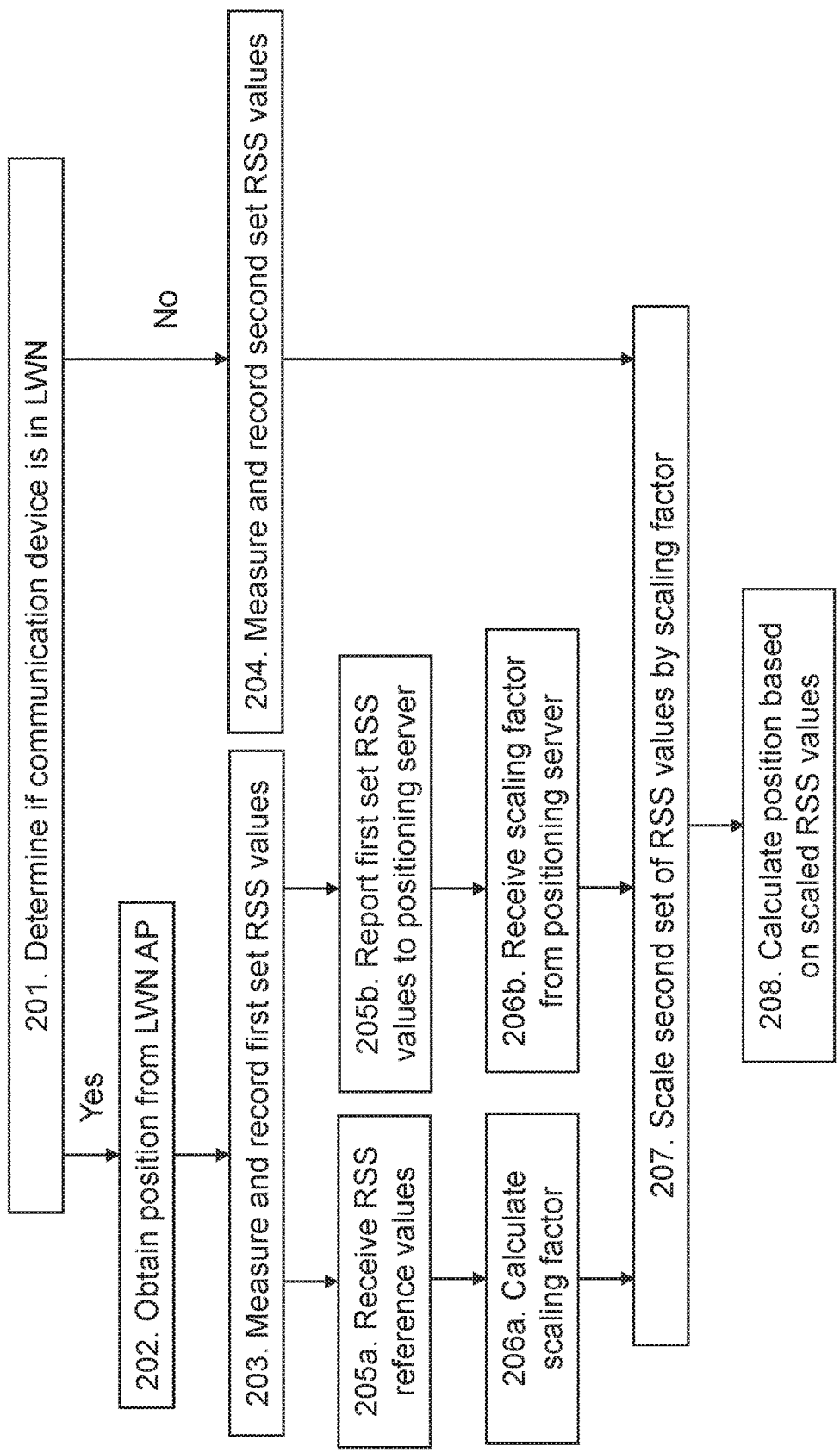
FIG. 2 is a flowchart depicting one embodiment of a method in a communication device.

Example of embodiments of a method in the communication device 150 for obtaining a position of the communication device 150 will now be described with reference to FIG. 2. As mentioned above, the communication device 150 operates in the wireless communication environment 100 and the wireless communications environment 100 comprises the LWN 130 and at least one of the cellular network 110 and the WLAN 120. The method comprises the following actions, which actions may be taken in any suitable order.

Action 201

When the communication device 150 moves around in the wireless communications environment 100, it usually monitors signals from the APs in the different networks. In order to localize its current position, the communication device 150 determines if it is in an LWN 130. The LWN usually covers a small area. If the communication device 150 is in the LWN, it may be sufficient just to associate its position to the LWN 130. This may be achieved by detecting or measuring the signal strength from an AP in the LWN 130. If it detects a signal from an AP, e.g. AP 132 or AP 134 in the LWN 130 and the signal strength of the access point AP is above a threshold, the communication device 150 is within a coverage of the AP, then it is determined that the communication device 150 is in the LWN 130.

Action 202

When the communication device 150 is in the LWN 130, it obtains its position from the LWN AP 132, 134 in the LWN 130. Because the LWN AP 132, 134 is well-positioned and localized, and have short coverage, the position obtained based on the position information of the LWN APs will have high accuracy. The position information of the LWN APs may be SSID or MAC address of the AP.

Action 203

The communication device 150 measures and records a first set of RSS values of one or more wider range APs 112, 114, 122, 124 when it is still in the LWN 130. The measured and recorded first set of RSS values are for calculations of scaling factors.

Action 204

When the communication device 150 moves out from an LWN 130, i.e. the communication device 150 is in an area which is not within the coverage of any LWNs, then its position may not be associated with any AP in the LWN. In order to localize its current position, its position need to be calculated based on measured RSS values. The communication device 150 thus measures and records a second set of RSS values of the one or more wider range APs 112, 114, 122, 124.

As discussed above, the measured RSS values are dynamic and depend heavily on the surrounding radio environment, and thus the positions computed directly from the measured RSS values are unstable and unreliable. Therefore according to embodiments herein, the measured second set of RSS values will be scaled by a scaling factor pre-calculated by the communication device 150 or by the positioning server 140 based on the first set of RSS values and RSS reference values of the one or more wider range APs 112, 114, 122, 124.

According to embodiments herein, the RSS reference values of the one or more wider range APs 112, 114, 122, 124 are measured by a reference device at each of the one or more LWN APs 132, 134 in the LWN 130 and saved together with identifications of the one or more LWN APs 132, 134 in the positioning server 140.

According to some embodiments herein, the scaling factor is calculated by the communication device 150. In these embodiments, the following actions are performed in the communication device 150:

Action 205a

The communication device 150 receives the RSS reference values of the one or more wider range APs 112, 114, 122, 124 from the positioning server 140.

Action 206a

The communication device 150 calculates the scaling factor for each of the one or more wider range APs 112, 114, 122, 124 based on the first set of RSS values and the received RSS reference values.

According some other embodiments herein, the scaling factor is calculated by the positioning server 140. In these embodiments, the following actions are performed in the communication device 150:

Action 205b

The communication device 150 reports the measured first set of RSS values together with an identification of the LWN AP 132, 134 to the positioning server 140.

Action 206b

The communication device 150 receives the scaling factors from the positioning server 140.

When the scaling factor is available to the communication device 150, it continues to take the following actions:

Action 207

The communication device 150 scales each of the second set of RSS values by the scaling factor calculated for each of the one or more wider range APs 112, 114, 122, 124 based on the first set of RSS values and the reference RSS values of the one or more wider range APs 112, 114, 122, 124.

Action 208

The communication device 150 calculates its position based on the scaled RSS values. The calculation method may be any relevant positioning method of the wider range wireless networks such as WiFi or 3GPP networks. The WiFi or 3GPP positioning is a specific program in a communication device to calculate positions of the communication device.

According to some embodiments herein, when the communication device 150 determines if it is in the LWN 130, i.e. Action 201, in order to get a more accuracy position when the coverage of the AP in the LWN 130 is large, the following actions may be performed in the communication device with reference to FIG. 3:

Action 301

The communication device 150 determines if it is at a position closest to an LWN AP 132, 134 in the LWN 130. This is achieved by the following actions:

Action 301a

The communication device 150 measures RSS values from the LWN AP 132, 134 in the LWN 130 at different positions.

Action 301b

The communication device 150 compares measured RSS values.

Action 301c

The communication device 150 determines that it is at a position closest to the LWN AP 132, 134 in the LWN 130 when the measured RSS values is at a peak.

When the communication device 150 is at a position closest to the LWN AP 132, 134 in the LWN 130, it obtains its position from the LWN AP132, 134 in the LWN 130 as in Action 202.

As discussed above, the measured RSS values may have errors due to various reasons and will cause position errors if used for calculations the position. Therefore, according to some embodiments herein, the measured RSS values which have errors may be excluded from calculating the position. As described above, the scaling factor for each of the one or more wider range APs is calculated based on the measured first set of RSS values and the reference RSS values, e.g. Scaling factor=Reference RSS value/Measured RSS value. Since the reference RSS values are measured by the reference devices at the same LWN as the measured first set of RSS values measured by the communication device, the errors in the RSS values may be reflected in the scaling factors. That is if the scaling factor for one AP is much smaller or bigger than others, it may reveal that the RSS values measured for this AP are wrong. To include the right RSS values in and exclude the wrong RSS values from the positioning calculation, the following actions are performed in the communication device 150 with reference to FIG. 4:

Action 401

The communication device 150 determines if the scaling factor for each of the wider range APs 112, 114, 122, 124 is within a predefined range.

Action 402

The communication device 150 sets the scaling factors of the wider range APs 112, 114, 122, 124 which are within the predefined range as valid and to be used for scaling measured RSS values of the respective APs for calculating the position.

Action 403

The communication device 150 sets the scaling factors of the wider range APs 112, 114, 122, 124 which are out of the predefined range as invalid and not to be used for scaling measured RSS values of the respective APs for calculating the position.

According to embodiments herein, the communication device 150 keeps measuring the RSS values of the APs for calculating its position periodically and updates its location database when a position change is larger than a predefined value. The new position data may be sent internally to its location database and/or other applications in the communication device 150. The applications may use the new position data in various ways.

According to some embodiments herein, the position of the communication device 150 is determined in a positioning server 140. Example of embodiments of a method in the positioning server 140 for determining the position of the communication device 150 will now be described with reference to FIG. 5. As mentioned above, the communication device 150 operates in a wireless communication environment 100, and the wireless communication environment 100 comprises wireless communication networks 110, 120 comprising one or more wider range APs 112, 114, 122, 124, and LWN 130 comprising one or more LWN APs 132, 134, the method performed in the positioning server 140 comprises the following actions, which actions may be taken in any suitable order.

Action 501

The positioning server 140 receives a first set of RSS values measured for one or more wider range APs 112, 114, 122, 124 by the communication device 150 when it is in an LWN 130.

Action 502

The positioning server 140 calculates a scaling factor for each of the one or more wider range APs 112, 114, 122, 124 based on the first set of RSS values and reference RSS values of the one or more wider range APs 112, 114, 122, 124.

Action 503

The a positioning server 140 receives a second set of RSS values measured for one or more wider range APs 112, 114, 122, 124 by the communication device 150 when it is not in an LWN 130.

Action 504

The positioning server 140 scales each of the second set of RSS values by the scaling factor calculated for or each of the one or more wider range APs 112, 114, 122, 124.

Action 505

The positioning server 140 calculates the position of the communication device 150 based on the scaled RSS values.

Action 506

The positioning server 140 sends the calculated position to the communication device 150.

According to some embodiments herein, the scaling factors may be calculated by the communication device 150 and sent to the positioning server 140. Then the above Actions 501, 502 may be replaced by an action of receiving scaling factors from the communication device 150 performed in the positioning server.

According to some embodiments herein, the measured RSS values will be checked and determined if they are suitable to use for calculating the position. In these embodiments, the following actions are further performed in the positioning server 140 with reference to FIG. 6.

Action 601

The positioning server 140 determines if the scaling factor for each of the wider range APs 112, 114, 122, 124 is within a predefined range.

Action 602

The positioning server 140 sets the scaling factors of the wider range APs 112, 114, 122, 124 which are within the predefined range as valid and to be used for scaling measured RSS values of the respective APs for calculating the position.

Action 603

The positioning server 140 sets the scaling factors of the wider range APs 112, 114, 122, 124 which are out of the predefined range as invalid and not to be used for scaling measured RSS values of the respective APs for calculating the position.

Figure 7:
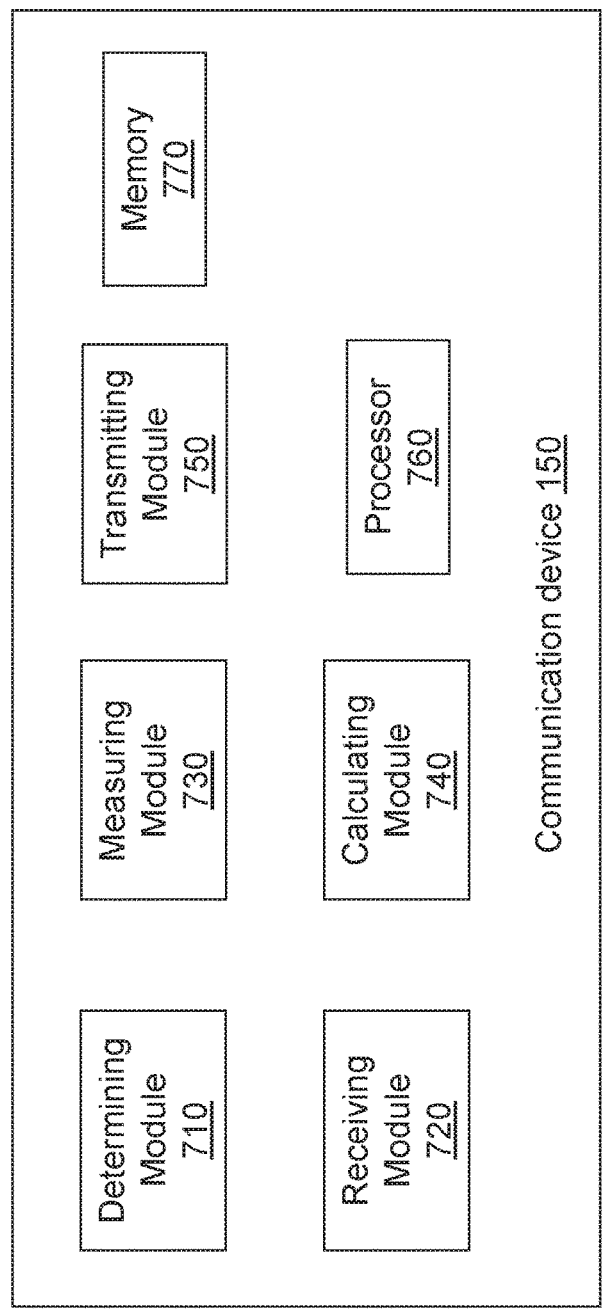
FIG. 7 is a schematic block diagram illustrating embodiments of a communication device.

To perform the method actions in the communication device 150 for obtaining a position of the communication device 150 described above in relation to FIGS. 2-4, the communication device 150 comprises the following circuits or modules depicted in FIG. 7. As mentioned above, the communication device 150 operates in the wireless communication environment 100 and the wireless communications environment 100 comprises wireless communication networks 110, 120 comprising one or more wider range APs 112, 114, 122, 124, and LWN 130 comprising one or more LWN APs 132, 134.

The communication device 150 is configured to, e.g. by means of a determining module 710 configured to, determine if the communication device 150 is in an LWN 130. The communication device 150 is configured to, e.g. by means of a receiving module 720 configured to, receive the position of the communication device 150 from an LWN AP 132, 134 in the LWN 130, when the communication device 150 is in the LWN 130. The communication device 150 is further configured to, e.g. by means of a measuring module 730 configured to, measure and record a first set of Received Signal Strength, RSS, values of one or more wider range APs 112, 114, 122, 124. The communication device 150 is further configured to, e.g. by means of the measuring module 730 configured to, measure and record a second set of RSS values of the one or more wider range APs 112, 114, 122, 124, when the communication device 150 is not in an LWN 130. The communication device 150 is further configured to, e.g. by means of a calculating module 740 configured to, scale each of the second set of RSS values by a scaling factor calculated for each of the one or more wider range APs 112, 114, 122, 124 based on the first set of RSS values and reference RSS values of the one or more wider range APs 112, 114, 122, 124 and calculate the position of the communication device 150 based on the scaled RSS values.

According to some embodiments herein, the scaling factor is calculated by the communication device 150 and the communication device 150 is further configured to, e.g. by means of the receiving module 720 configured to, receive the RSS reference values of the one or more wider range APs 112, 114, 122, 124 from a positioning server 140 and calculate, by means of the calculating module 740, the scaling factor for each of the one or more wider range APs 112, 114, 122, 124 based on the first set of RSS values and the received RSS reference values.

According to some embodiments herein, the scaling factor is calculated by a positioning server 140, and the communication device 150 is further configured to, e.g. by means of a transmitting module 750 configured to, report the measured first set of RSS values together with an identification of the LWN AP 132, 134 to the positioning server 140 and receive, by means of the receiving module 720, the scaling factors from the positioning server 140.

According to some embodiments herein, the communication device 150 is further configured to, by means of the determining module 710 configured to, determine if the communication device 150 is at a position closest to an LWN AP 132, 134 in the LWN 130. The communication device 150 is further configured to, by means of the measuring module 730 configured to, measure RSS values from the LWN AP 132, 134 in the LWN 130 at different positions. The communication device 150 is further configured to, by means of the determining module 710 configured to, compare measured RSS values and determine the communication device 150 is at a position closest to the LWN AP 132, 134 in the LWN 130 when the measured RSS values is at a peak.

According to some embodiments herein, the communication device 150 is further configured to, by means of the determining module 710 configured to, determine if the scaling factor for each of the wider range APs 112, 114, 122, 124 is within a predefined range, set the scaling factors of the wider range APs 112, 114, 122, 124 which are within the predefined range as valid and to be used for scaling measured RSS values of the respective APs for calculating the position; and set the scaling factors of the wider range APs 112, 114, 122, 124 which are out of the predefined range as invalid and not to be used for scaling measured RSS values of the respective APs for calculating the position.

Those skilled in the art will appreciate that the determining module 710, the receiving module 720, the measuring module 730, the calculating module 740 and the transmitting module 750 in the communication device 150 described above may be referred to one module, a combination of analog and digital circuits, one or more processors, such as processor 760, depicted in FIG. 7, configured with software and/or firmware and/or any other digital hardware performing the function of each module. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The communication device 150 may further comprise a memory 770 comprising one or more memory units. The memory 770 is arranged to be used to store obtained location information, measured RSS values, scaling factors, scaled RSS values or other measurements and data, as well as configurations to perform the methods herein when being executed in the communication device 150.

The embodiments herein in the communication device 150 for obtaining a position of the communication device 150 may be implemented through one or more processors, such as the processor 760 in the communication device 150, together with computer program code for performing the functions and actions of the embodiments herein. The program code mentioned above may also be provided as a computer program product, for instance in the form of a data carrier carrying computer program code for performing the embodiments herein when being loaded into the communication device 110. One such carrier may be in the form of a CD ROM disc. It is however feasible with other data carriers such as a memory stick. The computer program code may furthermore be provided as pure program code on a server and downloaded to the communication device 150.

Figure 8:
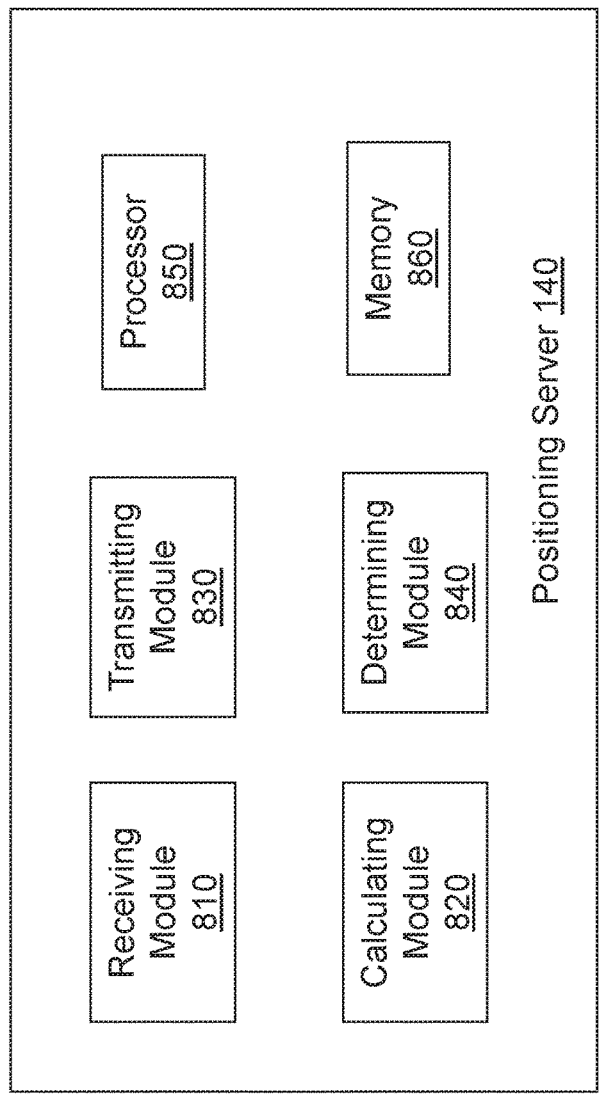
FIG. 8 is a schematic block diagram illustrating embodiments of a positioning server.

To perform the method actions in the positioning server 140 for determining a position of the communication device 150 described above in relation to FIGS. 5-6, the positioning server 140 comprises the following circuits or modules depicted in FIG. 8.

As mentioned above, the communication device 150 operates in the wireless communication environment 100 and the wireless communications environment 100 comprises wireless communication networks 110, 120 comprising one or more wider range APs 112, 114, 122, 124, and LWN 130 comprising one or more LWN APs 132, 134.

The positioning server 140 is configured to, e.g. by means of a receiving module 810 configured to, receive a first set of RSS values measured for one or more wider range APs 112, 114, 122, 124 by the communication device 150 when the communication device 150 is in an LWN 130.

The positioning server 140 is configured to, e.g. by means of a calculating module 820 configured to, calculate a scaling factor for each of the one or more wider range APs 112, 114, 122, 124 based on the first set of RSS values and reference RSS values of the one or more wider range APs 112, 114, 122, 124.

The positioning server 140 is configured to, e.g. by means of the receiving module 810 configured to, receive a second set of RSS values measured for one or more wider range APs 112, 114, 122, 124 by the communication device 150 when the communication device 150 is not in an LWN 130.

The positioning server 140 is configured to, e.g. by means of the calculating module 820 configured to, scale each of the second set of RSS values by the scaling factor calculated for or each of the one or more wider range APs 112, 114, 122, 124 and calculate the position of the communication device 150 based on the scaled RSS values.

The positioning server 140 is configured to, e.g. by means of a transmitting module 830 configured to, send the calculated position to the communication device 150.

According to some embodiments herein, the positioning server 140 is further configured to, e.g. by means of a determining module 840 configured to, determine if the scaling factor for each of the wider range APs 112, 114, 122, 124 is within a predefined range, and set the scaling factors of the wider range APs (112, 114, 122, 124) which are within the predefined range as valid and to be used for scaling measured RSS values of the respective APs for calculating the position; and further set the scaling factors of the wider range APs 112, 114, 122, 124 which are out of the predefined range as invalid and not to be used for scaling measured RSS values of the respective Aps for calculating the position.

Those skilled in the art will also appreciate that the receiving module 810, the calculating module 820, the transmitting module 830, the determining module 840 in the positioning server 140 described above may be referred to one module, a combination of analog and digital circuits, one or more processors, such as processor 850, depicted in FIG. 8, configured with software and/or firmware and/or any other digital hardware performing the function of each module. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The positioning server 140 may further comprise a memory 860 comprising one or more memory units. The memory 860 is arranged to be used to store reference RSS values, measured RSS values, scaled RSS values or other measurements and data, as well as configurations to perform the methods herein when being executed in the positioning server 140.

The embodiments herein in the positioning server 140 for determining a position of the communication device 150 may be implemented through one or more processors, such as the processor 850 in the positioning server 140, together with computer program code for performing the functions and actions of the embodiments herein. The program code mentioned above may also be provided as a computer program product, for instance in the form of a data carrier carrying computer program code for performing the embodiments herein when being loaded into the communication device 110. One such carrier may be in the form of a CD ROM disc. It is however feasible with other data carriers such as a memory stick. The computer program code may furthermore be provided as pure program code on a server and downloaded to the positioning server 140.

As described above, positioning methods according to embodiments herein may be implemented in a positioning server connected to a network, or in a communication device by using the common communication wireless networks with wide coverage, e.g. 3GPP network small cells or WiFi, in combination with localized networks with APs well-positioned and localized, e.g. Bluetooth Low Power or active NFC-like APs mounted at entrances of elevators or stairs in a building. Such a HetNet will provide an accurate position of the communication device within a localized network coverage and provide the real-time scaling factors of the Received Signal Strengths of the APs of the common communication wireless networks to be used for continuous tracking of the position changes between the localized network areas.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a communication device for obtaining a position of the communication device, wherein the communication device operates in a wireless communication environment, and the wireless communication environment comprises wireless communication networks comprising one or more Access Points, APs, and Localized Wireless Networks, LWN, comprising one or more LWN Access Points, LWN APs, wherein the APs in the wireless communication networks have a wider range compared to the LWN APs, the method comprising:
determining if the communication device is in an LWN;
when the communication device is in the LWN,
obtaining the position of the communication device from an LWN AP in the LWN;
measuring and recording a first set of Received Signal Strength, RSS, values of one or more wider range APs;
when the communication device is not in an LWN,
measuring and recording a second set of RSS values of the one or more wider range APs;
scaling each of the second set of RSS values by a scaling factor calculated for each of the one or more wider range APs based on the first set of RSS values and reference RSS values of the one or more wider range APs; and
calculating the position of the communication device based on the scaled RSS values.

2. The method according to claim 1, wherein the scaling factor is calculated by the communication device and the method further comprises:
receiving the RSS reference values of the one or more wider range APs from a positioning server;
calculating the scaling factor for each of the one or more wider range APs based on the first set of RSS values and the received RSS reference values.

3. The method according to claim 1, wherein the scaling factor is calculated by a positioning server, and the method further comprises:
reporting the measured first set of RSS values together with an identification of the LWN AP to the positioning server;
receiving the calculated scaling factors from the positioning server.

4. The method according to claim 2, wherein determining if the communication device is in the LWN further comprises:
determining if the communication device is at a position closest to an LWN AP in the LWN.

5. The method according to claim 4, wherein determining if the communication device is at a position closest to an LWN AP in the LWN further comprises:
measuring RSS values from the LWN AP in the LWN at different positions;
comparing measured RSS values;
determining the communication device is at a position closest to the LWN AP in the LWN when the measured RSS values is at a peak.

6. The method according to claim 2, wherein the RSS reference values of the one or more wider range APs are received by the communication device as measured by a reference device at each of the one or more LWN APs in the LWN and saved together with identifications of the one or more LWN APs in a positioning server.

7. The method according to claim 2, further comprising:
determining if the scaling factor for each of the wider range APs is within a predefined range;
setting the scaling factors of the wider range APs which are within the predefined range as valid and to be used for scaling measured RSS values of the respective APs for calculating the position;
setting the scaling factors of the wider range APs which are out of the predefined range as invalid and not to be used for scaling measured RSS values of the respective APs for calculating the position.

8. The method according to claim 1, further comprising measuring RSS values of the one or more wider range APs and calculating its position periodically, and updating location database when a position change is larger than a predefined value.

9. A method in a positioning server for determining a position of the communication device, wherein the communication device operates in a wireless communication environment, and the wireless communication environment comprises wireless communication networks comprising one or more Access Points, APs, and Localized Wireless Networks, LWN, comprising one or more LWN Access Points, LWN APs, wherein the APs in the wireless communication networks have a wider range compared to the LWN APs, the method comprising:
receiving a first set of RSS values measured for one or more wider range APs by the communication device when the communication device is in an LWN;
calculating a scaling factor for each of the one or more wider range APs based on the first set of RSS values and reference RSS values of the one or more wider range APs;
receiving a second set of RSS values measured for one or more wider range APs by the communication device when the communication device is not in an LWN;
scaling each of the second set of RSS values by the scaling factor calculated for each of the one or more wider range APs;
calculating the position of the communication device based on the scaled RSS values; and
sending the calculated position to the communication device.

10. The method according to claim 9, wherein the RSS reference values of the one or more wider range APs are measured by a reference device at each of the one or more LWN APs in the LWN and saved together with identifications of the one or more LWN APs in the positioning server.

11. The method according to claim 9, further comprising:
determining if the scaling factor for each of the wider range APs is within a predefined range;
setting the scaling factors of the wider range APs which are within the predefined range as valid and to be used for scaling measured RSS values of the respective APs for calculating the position; and
setting the scaling factors of the wider range APs which are out of the predefined range as invalid and not to be used for scaling measured RSS values of the respective Aps for calculating the position.

12. A communication device for obtaining a position of the communication device, wherein the communication device operates in a wireless communication environment, and the wireless communication environment comprises wireless communication networks comprising one or more Access Points, APs, and Localized Wireless Networks, LWN, comprising one or more LWN Access Points, LWN APs, wherein the APs in the wireless communication networks have a wider range compared to the LWN APs, the communication device is configured to:
determine if the communication device is in an LWN;
when the communication device is in the LWN, receive the position of the communication device from an LWN AP in the LWN;

measure and record a first set of Received Signal Strength, RSS, values of one or more wider range APs;

when the communication device is not in an LWN, measure and record a second set of RSS values of the one or more wider range APs;

scale each of the second set of RSS values by a scaling factor calculated for each of the one or more wider range APs based on the first set of RSS values and reference RSS values of the one or more wider range APs; and calculate the position of the communication device based on the scaled RSS values.

13. The communication device according to claim 12, wherein the scaling factor is calculated by the communication device and the communication device is further configured to:

receive the RSS reference values of the one or more wider range APs from a positioning server; and calculate the scaling factor for each of the one or more wider range APs based on the first set of RSS values and the received RSS reference values.

14. The communication device according to claim 12, wherein the scaling factor is calculated by a positioning server, and the communication device is further configured to:

report the measured first set of RSS values together with an identification of the LWN AP to the positioning server;

receive the scaling factors from the positioning server.

15. The communication device according to claim 12, wherein the communication device is further configured to:

determine if the communication device is at a position closest to an LWN AP in the LWN.

16. The communication device according to claim 15, wherein the communication device is further configured to:

measure RSS values from the LWN AP in the LWN at different positions;

compare measured RSS values; and determine the communication device is at a position closest to the LWN AP in the LWN when the measured RSS values is at a peak.

17. The communication device according to claim 13, wherein the RSS reference values of the one or more wider range APs are received by the communication device 150 as measured by a reference device at each of the one or more LWN APs in the LWN and saved together with identifications of the one or more LWN APs in a positioning server.

18. The communication device according to claim 12, wherein the communication device is further configured to:

determine if the scaling factor for each of the wider range APs is within a predefined range;

set the scaling factors of the wider range APs which are within the predefined range as valid and to be used for scaling measured RSS values of the respective APs for calculating the position; and set the scaling factors of the wider range APs which are out of the predefined range as invalid and not to be used for scaling measured RSS values of the respective APs for calculating the position.

19. The communication device according to claim 12, wherein the communication device is further configured to measure RSS values of the one or more wider range APs and calculate its position periodically, and update location database when a position change is larger than a predefined value.

20. A positioning server for determining a position of the communication device, wherein the communication device operates in a wireless communication environment, and the wireless communication environment comprises wireless communication networks comprising one or more Access Points, APs, and Localized Wireless Networks, LWN, comprising one or more LWN Access Points, LWN APs, wherein the APs in the wireless communication networks have a wider range compared to the LWN APs, the positioning server is configured to:

receive a first set of RSS values measured for one or more wider range APs by the communication device when the communication device is in an LWN;

calculate a scaling factor for each of the one or more wider range APs based on the first set of RSS values and reference RSS values of the one or more wider range APs;

receive a second set of RSS values measured for one or more wider range APs by the communication device when the communication device is not in an LWN;

scale each of the second set of RSS values by the scaling factor calculated for each of the one or more wider range APs;

calculate the position of the communication device based on the scaled RSS values; and send the calculated position to the communication device.

21. The positioning server according to claim 20, wherein the RSS reference values of the one or more wider range APs are measured by a reference device at each of the one or more LWN APs in the LWN and saved together with identifications of the one or more LWN APs in the positioning server.

22. The positioning server according to claim 20, wherein the positioning server is further configured to:

determine if the scaling factor for each of the wider range APs is within a predefined range;

set the scaling factors of the wider range APs which are within the predefined range as valid and to be used for scaling measured RSS values of the respective APs for calculating the position; and set the scaling factors of the wider range APs which are out of the predefined range as invalid and not to be used for scaling measured RSS values of the respective APs for calculating the position.

\* \* \* \* \*